United States Patent [19]

Kelly

[11] 4,271,027

[45] * Jun. 2, 1981

[54] SEWAGE TREATMENT SYSTEM AND PROCESS

[75] Inventor: Earl M. Kelly, Hillsborough, Calif.

[73] Assignee: Envirotech Corporation, Menlo Park, Calif.

[*] Notice: The portion of the term of this patent subsequent to Apr. 4, 1995, has been disclaimed.

[21] Appl. No.: 25,804

[22] Filed: Apr. 2, 1979

Related U.S. Application Data

[63] Continuation-in-part of Ser. No. 859,768, Dec. 12, 1977, Pat. No. 4,173,534, which is a continuation-in-part of Ser. No. 728,480, Sep. 20, 1976, Pat. No. 4,082,671.

[51] Int. Cl.³ .................... C02B 3/00; B01D 21/10
[52] U.S. Cl. .................... 210/609; 210/703; 210/195.3; 210/221.2; 210/197; 210/202; 210/537
[58] Field of Search .............. 210/44, 195.1, 195.3, 210/197, 151, 221 R, 202, 537, 9, 10, 13–15, 208, 519, 520, 609, 703

[56] References Cited

U.S. PATENT DOCUMENTS

| | | |
|---|---|---|
| 2,679,477 | 5/1954 | Kivari ........................... 210/221 P |
| 2,713,026 | 7/1955 | Kelly ............................... 210/3 |
| 2,772,234 | 11/1956 | Kelly ............................. 210/44 |
| 2,779,730 | 1/1957 | Kelly et al. ................. 210/537 |
| 3,140,259 | 7/1964 | Kelly ......................... 210/195.3 |
| 3,622,508 | 11/1971 | Komline ........................ 210/44 |
| 3,642,617 | 2/1972 | Brink et al. .................... 210/44 |
| 4,082,671 | 4/1978 | Kelly ......................... 210/195.1 |
| 4,173,534 | 11/1979 | Kelly ........................... 210/537 |

*Primary Examiner*—Ivars C. Cintins
*Assistant Examiner*—E. Rollins Cross
*Attorney, Agent, or Firm*—Robert E. Krebs; T. J. McNaughton; T. S. MacDonald

[57] ABSTRACT

The following disclosure teaches ways and means for clarifying raw sewage and thickening secondary sewage sludge. The disclosed apparatus comprises a tank having upper and lower feedwells disposed therein. Raw sewage is introduced into the lower feedwell and flows into the lower part of the tank to be clarified therein, and secondary sludge is aerated and introduced into the upper feedwell so that it flows therefrom and thickens in the upper part of the tank by flotation type thickening.

21 Claims, 3 Drawing Figures

SEWAGE TREATMENT SYSTEM AND PROCESS

This application is a continuation-in-part of U.S. Pat. Application Ser. No. 859,768, filed Dec. 12, 1977, now U.S. Pat. No. 4,173,534, which in turn is a continuation-in-part of U.S. Patent Application Ser. No. 728,480, filed Sept. 30, 1976, now U.S. Pat. No. 4,082,671.

BACKGROUND OF THE INVENTION

1. Field of the Invention

This invention relates to ways and means to purify municipal or industrial wastewater.

2. State of the Art

In a conventional wastewater treatment system of the activated sludge type, particle-bearing wastewater is passed through a primary clarifier wherein solid particles settle gravitationally while clarified wastewater is removed from the upper part of the clarifier. The clarified wastewater is thereafter passed into a biological treatment unit wherein air or oxygen is added to encourage growth and reproduction of micro-organisms in the wastewater. The effluent from the biological treatment unit is then passed into a so-called secondary clarifier wherein the micro-organisms settle to the bottom while clarified wastewater is removed and discharged to a receiving water such as a river. The settled micro-organisms in the secondary clarifier are removed and portions thereof are returned to the biological treatment unit to provide therein a living culture of micro-organisms called activated sludge. The remainder of the micro-organisms settled in the secondary clarifier (called secondary sludge) and the solid particles settled in the primary clarifier (called primary sludge) are together discharged from the system for disposal. The primary and secondary sludges usually contain about 97% water or more; usually it is desirable to remove much of that water to increase the concentration of solids and to reduce the cost of subsequent disposal of the sludge. Devices which remove water from sludge are called thickeners and may be of various kinds, including gravity and flotation type.

In a typical gravity type thickener, sludge is allowed to settle in a tank so that sludge particles become more concentrated near the bottom of the tank while clarified liquid rises to the surface as it is displaced by the settling particles. Thickened sludge is then removed from the bottom of the tank.

In a typical flotation type thickener, feed sludge is first aerated at super atmospheric pressure and then is introduced into the flotation tank, which is at atmospheric pressure, so that the air within the sludge forms bubbles which carry sludge particles to the liquid surface in the tank. The thickened sludge at the tank surface is then removed while clarified liquid is removed from a separate part of the tank.

OBJECTS OF THE INVENTION

An object of the present invention is to provide ways and means for concomitantly clarifying raw sewage and thickening secondary sludge. Another object is to provide improved ways and means for inhibiting anaerobic decomposition of primary sludge in the lower part of a primary clarifier.

Further objects and advantages of the present invention may be readily ascertained from the following description and appended illustrations which are offered by way of illustration only and not in limitation of the invention, the scope of which is defined by the appended claims and equivalents.

DETAILED DESCRIPTION OF THE PREFERRED EMBODIMENT

Figure 1:
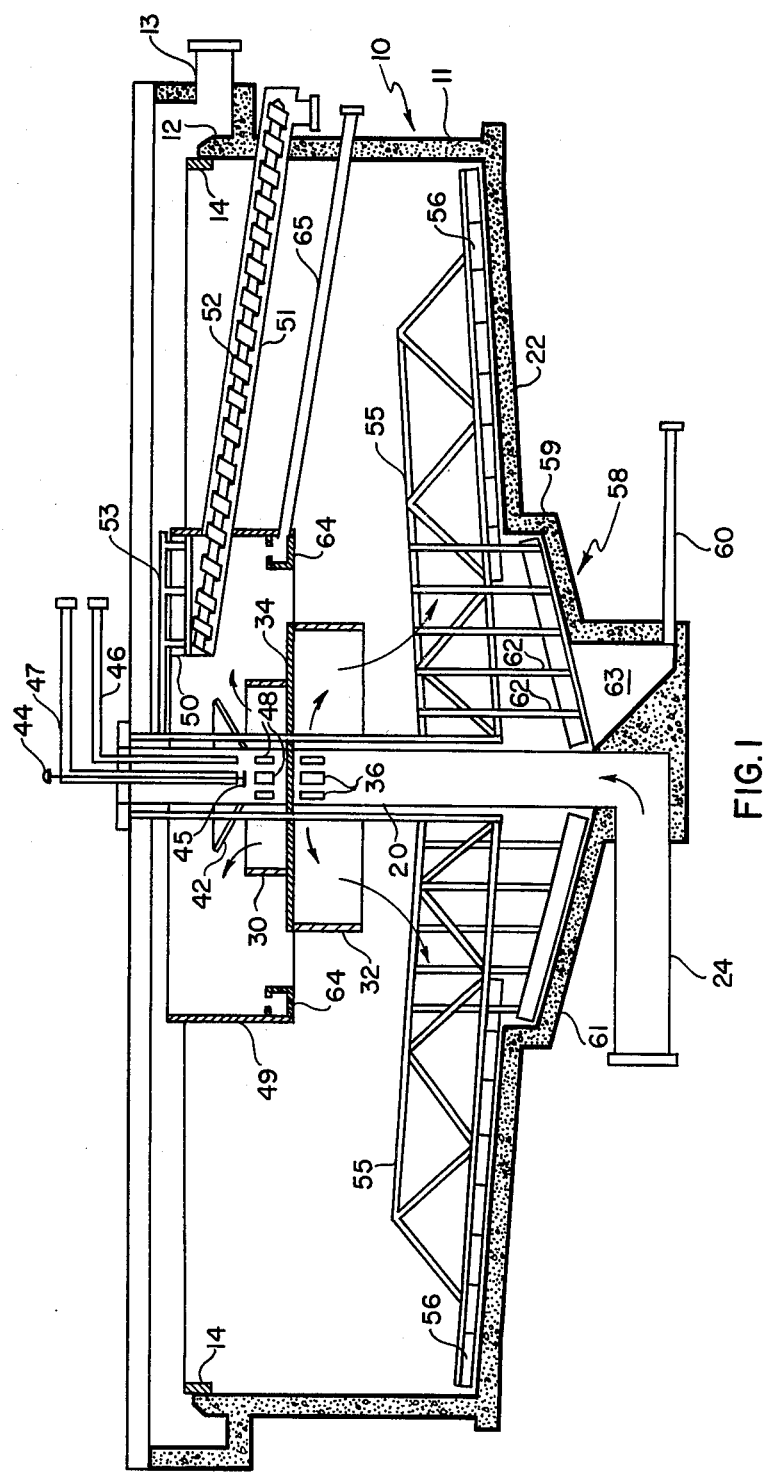
FIG. 1 is a sectional elevation of the preferred embodiment of apparatus according to the present invention, portions of which are illustrated schematically.

The apparatus illustrated in FIG. 1 generally includes an open-topped tank 10, preferably of cylindrical configuration with an upstanding sidewall 11, which receives raw sewage and secondary sludge for treatment. A launder 12 is formed around the periphery of the sidewall of the tank 10, and mounted peripherally about the launder 12 is an adjustable weir wall 14 which defines the liquid level in the tank. A conduit 13 is connected in communication with the interior of the launder 12 to convey effluent liquid therefrom to disposal. In the illustrated embodiment, a hollow center column 20 is vertically disposed in the center of the tank and affixed to the floor 22 to support other components of the device. An influent conduit 24 is coupled to the lower end of the center column 20 to introduce raw sewage thereinto.

According to FIG. 1, an upper feedwell 30 and a lower feedwell 32 are stationarily mounted generally concentric within the tank 10, one above the other. Both feedwells should be understood to be rigidly supported from the center column 20, and alternative support means could be provided. Generally speaking, the upper feedwell 30 is a means for directing a stream of aerated secondary sludge upward into the tank 10, and the lower feedwell 32 is a means for directing a stream of raw sewage downward into the tank 10 as indicated by the curved arrows emanating from the respective feedwells. Usually, the two feedwells are positioned such that the lower feedwell 32 is located about midway between the bottom and top of the tank 10, but the exact vertical disposition of the feedwells can vary depending, among other things, upon the characteristics of the sewage and sludge being treated and their rates of flow.

In the illustrated embodiment, the lower feedwell 32 is a tubular member of cylindrical configuration which is open at the bottom and, preferably covered at the top by a closure means such as plate 34. This plate 34 is optional; if the plate 34 is not utilized, the feedwell can be affixed to the center column 20 by rods or the like. A plurality of ports 36 are formed in the center column 20 in communication with lower feedwell 32 to permit raw sewage to flow thereinto.

The upper feedwell 30, shown in FIG. 1, is a cylindrical tubular member, open at the top and closed at the bottom. Preferably, the aforementioned, optional plate 34 comprises both the bottom wall of the upper feedwell 30 and the top wall of the lower feedwell 32. A feed pipe 46 is disposed inside the upper end of the center column 20 to carry secondary sludge into the center column 20 above the plate 34. A second pipe 47 extends into the upper end of the center column 20 to carry aerated liquid thereinto to mix with the secondary sludge. The pipe 47 includes a valve 44 which has a circular plate 45 affixed to its lower end. The valve 44 can be adjusted so that the plate 45 is spaced apart from the end of the pipe 47 a predetermined distance to control the rate of flow from the pipe. A plurality of ports 48 are formed in the center column to permit the aerated secondary sludge to flow into the upper feedwell 30. Preferably, an inverted conical baffle 42 is fixedly mounted about the center column 20 above the upper feedwell 30 to direct the flow of aerated secondary sludge radially outward from the upper feedwell.

A continuous partition wall 49 of upright cylindrical configuration is stationarily mounted in the upper part of the tank 10 generally concentric and radially outward of the upper feedwell 30 so that an annular space is defined between the partition wall 49 and the sidewall of the tank 10. The upper edge of the partition wall 49 extends above the liquid level in the tank 10 and the lower edge of the wall extends sufficiently deep into the tank so that the aerated secondary sludge discharged from the upper feedwell 30 flows into the zone encompassed by the partition wall 49. The purpose of the partition wall 49 is to contain or encompass aerated secondary sludge within a defined zone in the upper part of the tank 10. As will be discussed below, separation of solids from liquid in the secondary sludge is accomplished in this zone whereby solids float upward from the secondary sludge while liquid from the sludge flows downward beneath the lower edge of the partition wall 49 into the annular space surrounding the partition wall for subsequent discharge.

The apparatus of FIG. 1 further includes a conventional float collection box 50 which is stationarily mounted within the zone encompassed by the partition wall 49 to collect solids floating on the liquid surface in that zone. A conduit 51 having a screw-type conveyor 52 disposed therein is connected in communication with the float box 50 to convey the collected solids to disposal outside the tank 10. To urge floating solids into the float box 50, there is provided a conventional rotary skimmer mechanism inclusive of skimmer paddles 53. The skimmer mechanism is mounted to be rotatable by a drive means, not shown. The drive means moves the skimmer paddles 53 across the surface of the liquid within the area inside the partition wall 49, and floating solids are pushed by the paddles into the float collection box 50.

Referring still to FIG. 1, radially-extending rake arms 55 are coupled to the lower end of the drive means to be driven to rotate across the floor of the tank 10. Fixed to the rake arms 55 are raking blades 56 positioned to push primary sludge to a thickening well 58 formed in the center of the bottom of the tank 10. The thickening well 58 is defined by a cylindrical wall 59 extending downward from the floor 22, and the well 58 has a floor 61 which slopes downward slightly toward the center column 20. A conduit 60 is connected in communication with a sludge pocket 63 affixed to the floor 61 to convey the thickened primary sludge to disposal. Also fixed to the rake arms for rotation therewith are vertical members 62, known in the art as pickets, which extend upward at spaced apart intervals in the thickening well 58. During rotation with the rake arms, the pickets 62 gently agitate the liquid in the thickening well and thereby enhance thickening and flocculation of the primary sludge in that zone. It should be understood that the thickening well 58 is optional, and if thickening of the primary sludge is not required, the floor 22 can extend to the center column 20 with the sludge pocket 63 coupled to the floor 22. This configuration of the floor and the sludge pocket is conventional and is taught, for example, in my U.S. Pat. No. 2,713,026.

The apparatus in FIG. 1 further includes a perforated pipe 64 which is mounted within the partition wall 49, and a conduit 65 connected to the pipe 64 extends sealingly through the tank sidewall. The perforated pipe 64 encircles the upper feedwell 30 in a horizontal plane and is affixed to the lower edge of the partition wall 49. The purpose of the perforated pipe, as will be explained in more detail later, is to serve as an auxiliary means for collecting wastewater from which solids have separated by flotation.

The operation of the aforedescribed device in combination with a wastewater treatment system of the activated sludge type can now be understood. With regard to the lower zone of the tank 10, raw sewage is continuously delivered into the lower feedwell 32 via center column 20 and flows radially outward and downward therefrom into the tank. It should be appreciated that the sewage can be pretreated before introduction into the lower feedwell 32. Such pretreated sewage will, however, be called raw sewage throughout this application.

In the lower zone of the tank, solids settle from the raw sewage under the influence of gravity. The settled fraction of the sewage, called primary sludge, is raked by the blades 56 across the tank floor 22 into the thickening well 58. In the well 58 the primary sludge settles and thickens while liquid rises therefrom. If the thickening well 58 is not utilized, sludge is raked from the tank floor 22 into the sludge pocket 63. Concomitantly, clarified liquid separates from the raw sewage and flows upward into the annular space between the partition wall 49 and the tank sidewall. Then this supernatant liquid flows over the weir wall 14 into the trough 12 and is carried to discharge via the conduit 13.

In the upper zone of the tank 10, secondary sludge is continuously pumped into the center column 20 via the conduit 46. Aerated liquid is also pumped into the upper end of the center column 20, and the valve 44 is adjustably positioned so that the liquid is maintained under pressure until it leaves the pipe 47. In the center column 20 the aerated liquid and secondary sludge mix to form aerated secondary sludge. The term "aerated secondary sludge" here means sludge which has been removed from the secondary clarifier of an activated sludge system and treated so that it contains air in dissolved, micronized or emulsified form. Systems to form aerated secondary sludge will be described hereinafter. Upon entry into the upper feedwell 30, the aerated secondary sludge flows upward and radially outward into the tank.

When the aerated secondary sludge is exposed to atmospheric pressure bubbles of air form in the sludge and cause solid particles from the sludge to float to the surface of the liquid in the tank. The floated solids are then urged into the float box 50 by the skimmer paddles 53 and are carried to disposal via the conduit 51. Liquid from which the solids have been floated flows downward below the partition wall 49 and then upward into the annular space surrounding the partition wall. From there, that liquid flows over the weir 14 into the launder 12 and is continuously drawn off to discharge via the conduit 13. When utilized, the perforated pipe 64 serves to collect a portion of the downwardly flowing liquid from the thickening secondary sludge.

It should be appreciated that there is synergistic effect when both primary sludge and aerated secondary sludge are processed in superimposed zones in the same tank as described above. To wit, the aerated secondary sludge in the upper zone of the tank contains substantially more oxygen than does the primary sludge, and, accordingly, the secondary sludge forms a blanket of oxygen-rich liquid above the body of primary sludge in the thickening well 58. This oxygen-rich blanket diminishes the tendency of the primary sludge to become anaerobic and, further, promotes the aerobic decomposition of any solid particles which rise into the blanket from the underlying body of primary sludge. Moreover, oxygen-rich liquid forms a blanket above the sludge in the lower part of the clarifier thereby advantageously reducing the tendency of the sludge to become anaerobic. This advantageous result is realized regardless of whether the thickening well 58 is utilized.

One advantage of utilizing the perforated pipe 64 as an auxiliary liquid removal means can now be appreciated. That is, the liquid collected by the perforated pipe can be readily admixed with the aerated secondary sludge in the upper feedwell 30 in order to dilute that sludge to a desired concentration, which dilution has been found to enhance the flotation of solids from aerated secondary sludge.

Figure 2:
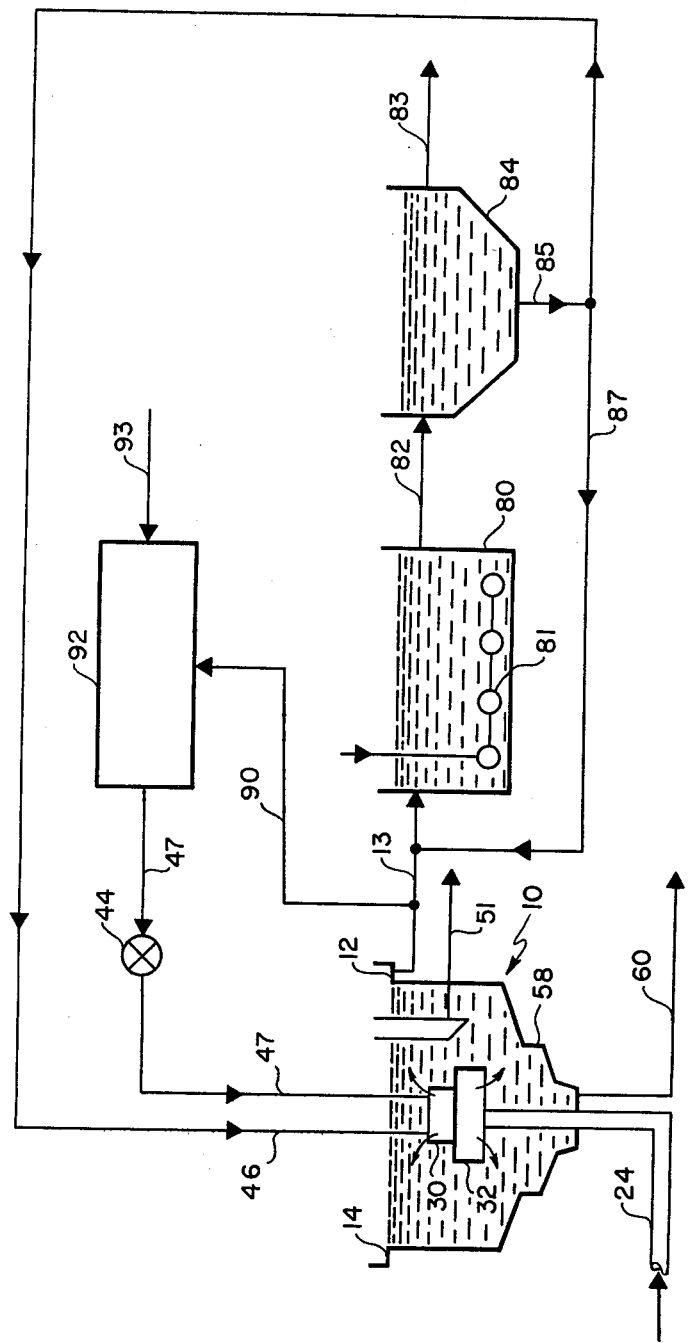
FIG. 2 is a schematic diagram of a system according to the present invention.

In FIG. 2, the aforedescribed apparatus is shown as one unit in a system to biologically treat sewage and thicken the sludges produced by such treatment. In the system, primary or raw sewage is conveyed into the tank 10 via line 24. In the tank 10, primary sludge settles from the raw sewage and flows into the thickening well 58. The thickened sludge is removed from the well 58 via line 60 and conveyed to disposal.

As further shown in the system of FIG. 2, supernatant wastewater from the tank 10 is carried, via conduit 13, into a biological treatment unit 80. Biological treatment units are well known and available in various configurations; the illustrated one should be understood to include a liquidholding tank and means for introducing air or oxygen gas into the wastewater, say by means of a perforated-pipe diffuser 81 disposed at the bottom of the tank. In the biological treatment unit 80, micro-organisms act upon the wastewater to convert some of the pollutants therein into additional micro-organisms and various by-products. The effluent from the biological treatment unit is usually called secondary sewage and will be so referred to hereinafter.

From the biological treatment unit 80, the secondary sewage is conveyed, via conduct 82, into secondary clarifier 84 which serves the purpose of settling the micro-organisms from the wastewater to form the aforementioned secondary sludge. From the secondary clarifier supernatant liquid is discharged, via line 83, to a receiving water such as a river. Secondary sludge is discharge from the secondary clarifier 84 through conduit 85. A first predetermined portion of that secondary sludge is returned, via line 87, to the biological treatment unit 80 to provide a culture of micro-organisms to act upon the sewage therein. The remainder of the secondary sludge is carried by line 46 into the upper end of the center column 20 where it is mixed with aerated liquid as will be described hereinafter. The mixture is thereafter introduced into the upper feedwell 30.

Clarified sewage leaves the tank 10 via line 13, and part of the liquid is transferred to the biological treatment unit 80 and part to a pressurized aeration unit 92 via line 90.

In the pressurized aeration unit 92 the effluent liquid is saturated with dissolved air, say by spraying the liquid against a baffle so that air, introduced under pressure into the unit via line 93, is absorbed into the liquid in dissolved, micronized or emulsified form. The aerated liquid is conveyed under pressure via conduit 47 to valve 44. The valve permits reduction of the pressure on the liquid so that as the liquid passes through conduit 47 to be mixed with secondary sludge in the center column 20, bubbles of air begin to form. The mixture of secondary sludge and aerated effluent liquid flows from the center column 20 into the feedwell 30.

Aerated secondary sludge enters tank 10 through upper feedwell 30, and bubbles of air in the sludge cause it to rise and thicken. The thickened secondary sludge is forced by skimmer paddles 52 into float box 50, and conduit 51 conveys the thickened sludge therefrom to disposal. Liquid which separates from thickening secondary sludge flows downward below the lower edge of partition wall 49 and then upward over weir 14, into launder 12 and thereafter from the tank 10 via conduit 13. Raw sewage enters tank 10 through lower feedwell 32 to settle and thicken in tank 10 and is thereafter discharged to disposal via conduit 60. Liquid which separates from the thickening sludge flows upward over weir 14, into launder 12 and thereafter from tank 10 via conduit 13.

Figure 3:
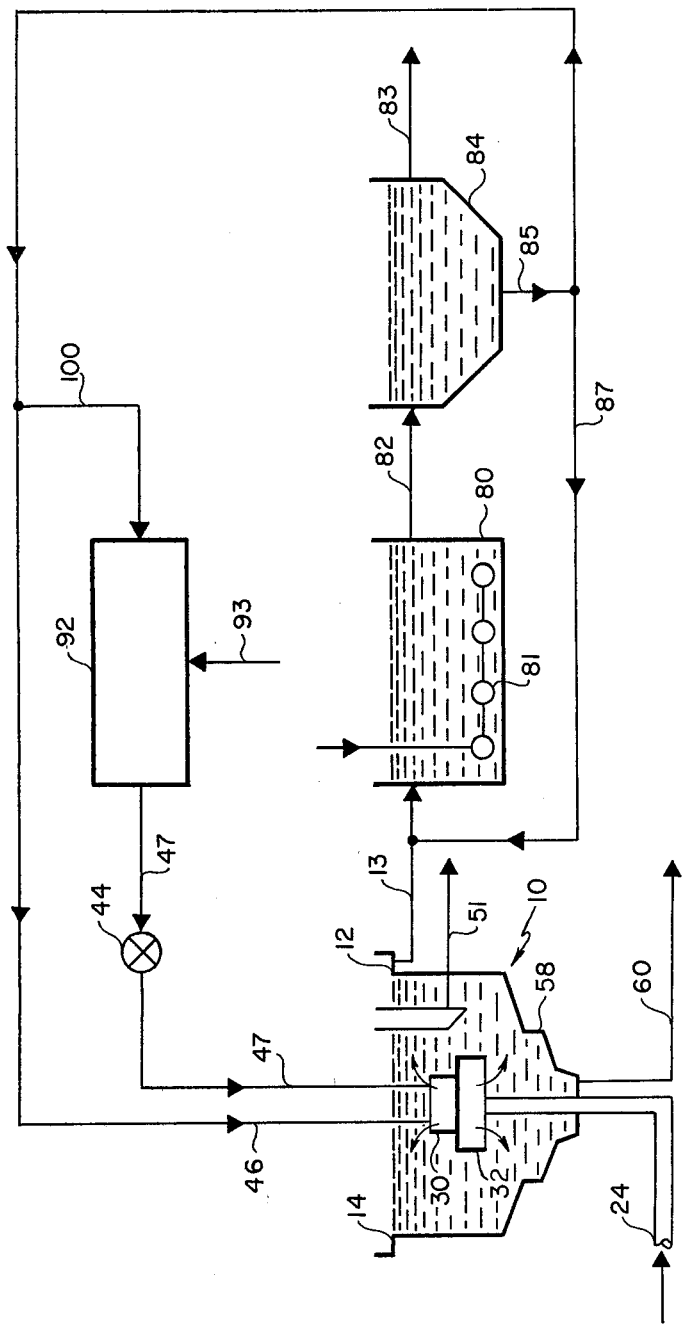
FIG. 3 is a schematic diagram of a second system according to the present invention.

The system shown in FIG. 3 is similar to that shown in FIG. 2, and corresponding parts are numbered the same. In the system shown in FIG. 3, part of the secondary sludge is conveyed via line 100 from line 46 to the pressurized aeration unit 92. The secondary sludge is aerated, and then transferred via line 47 to be mixed with the unaerated secondary sludge in the center column. The mixture of sludges is thereafter introduced into the upper feedwell 30.

It should be understood that in some applications neither effluent liquid nor secondary sludge is transferred to the pressurized aeration unit 92. But rather a fraction of the supernatant liquid leaving the final clarifier 84, via line 83 is transferred to the pressurized aeration unit 92. The resulting aerated supernatant liquid is thereafter mixed with secondary sludge in line 85, and the mixture is transferred to the upper feedwell 30. It should be further understood that water from an outside source, such as tap water can also be used in place of the supernatant liquid in some applications.

I claim:

1. An apparatus for the concomitant treatment of raw sewage and secondary sewage sludge from a secondary clarifier comprising:
   a. a tank having an open top and a generally upstanding sidewall to contain a body of liquid;
   b. an upper feedwell mounted in said tank;
   c. pressurized aeration means connected in liquid flow communication with said upper feedwell for forming a stream of aerated liquid at superatmospheric pressure and for introducing the aerated liquid into said upper feedwell;
   d. first feed means connected in liquid flow communication between the secondary clarifier and said upper feedwell for introducing secondary sludge thereinto for mixing with the aerated liquid and distribution by said upper feedwell into said tank;
   e. a lower feedwell mounted in said tank below said upper feedwell and second feed means connected in liquid flow communication between a source of raw sewage and said lower feedwell for introducing raw sewage thereinto for distribution by said lower feedwell into said tank below the aerated secondary sludge introduced through said upper feedwell;

f. a continuous, upstanding partition wall mounted in said tank generally concentric and radially outward of said upper feedwell to define a confined liquid zone surrounding said upper feedwell and to define a generally annular space between said partition wall and said tank sidewall;

g. means mounted on said sidewall for drawing liquid from the surface of the body of liquid contained in said annular space to maintain a predetermined liquid level in said tank;

h. float collection means mounted within said confined liquid zone for collecting solids floating on the surface of the liquid within said confined zone; and i. sediment collection means connected in communication with the bottom of said tank for collecting and discharging sediment from said tank.

2. An apparatus according to claim 1 further including a thickening well coupled to the floor of said tank and disposed below said lower feedwell.

3. An apparatus according to claim 1 wherein said upper feedwell is an upright tubular member and is open at its top and closed at its bottom.

4. An apparatus according to claim 3 further including an inverted conical baffle mounted above said upper feedwell to distribute flow therefrom radially outward into said tank.

5. An apparatus according to claim 1 further including a raking mechanism mounted for rotation in said tank to urge sediment therein toward said sediment collection means.

6. An apparatus according to claim 5 further including picket members mounted to said raking mechanism for rotation therewith to agitate the primary sludge in the lower part of said tank.

7. An apparatus according to claim 1 wherein said float collection means comprises a float collection box and a skimmer mechanism mounted for rotation in said tank to urge solids floating on the surface of the liquid body in said tank into said float collection box.

8. An apparatus according to claim 7 further including drive unit means mounted above said tank and coupled to rotatably drive said raking mechanism and said skimmer mechanism.

9. An apparatus according to claim 3 wherein said lower feedwell is an upright tubular member with a closed top and an open bottom.

10. An apparatus according to claim 1 further including perforated conduit means mounted within said confined liquid zone in said tank adjacent the lower edge of said upstanding partition wall to collect liquid from said confined liquid zone.

11. An apparatus according to claim 1 wherein said first feed means includes pressure relief valve means to introduce a stream of aerated liquid into said upper feedwell and maintain the liquid under pressure until it leaves said feed means.

12. A process for concomitantly clarifying raw sewage, and thickening secondary sewage sludge comprising:

a. introducing a stream of raw sewage into the lower part of a liquid holding tank;

b. aerating a stream of secondary sludge to produce a stream of aerated secondary sludge;

c. introducing the stream of aerated secondary sludge into a confined zone in the upper part of the liquid holding tank to form a layer above the sewage;

d. allowing the aerated secondary sludge to thicken in the confined zone and allowing primary sludge to settle from the sewage to the bottom of the tank, and removing the primary sludge therefrom;

e. removing thickened secondary sludge from the surface of the liquid in said confined zone; and f. removing a stream of clarified wastewater from the tank outside said confined zone.

13. The process of claim 12 further including the steps of:

a. permitting the primary sludge to flow to a thickening well in the lower part of the tank and to thicken therein; and b. removing thickened primary sludge from the thickening well.

14. In a wastewater treatment system of the activated sludge type including a primary clarifier, a biological treatment unit and a secondary clarifier, the improvement comprising:

a. a treatment unit for concomitantly treating sewage and aerated secondary sludge, said treatment unit including an open tank having a floor and a continuous partition wall mounted to define a confined liquid zone in the upper part of said tank;

b. means connected to said tank for introducing raw sewage into the lower part of said tank;

c. float collection means mounted within said confined liquid zone in said tank for collecting solids floating on the surface of the liquid within said confined zone;

d. sediment collection means connected in communication with said floor for collecting and discharging sediment from the lower part of said treatment unit;

e. discharge means mounted in said tank outside said confined liquid zone for drawing effluent liquid from the surface of the body of liquid held in said tank outside said confined liquid zone;

f. pressurized aeration means connected in liquidflow communication with said discharge means to aerate a portion of the effluent liquid at super atmospheric pressure;

g. means to introduce the aerated effluent liquid into a stream of secondary sludge from said secondary clarifier to produce aerated secondary sludge; and h. means to convey the aerated secondary sludge into the upper part of said tank.

15. A system according to claim 14 further including a raking mechanism mounted for rotation in said tank to urge sediment therein toward the center of said floor.

16. A system according to claim 15 further including a thickening well coupled to the floor of said tank.

17. A system according to claim 16 further including picket members mounted to said raking mechanism for rotation therewith to agitate the sludge in said thickening well.

18. A system according to claim 14 wherein said float collection means comprises a float collection box and a skimmer mechanism mounted for rotation in said tank to urge solids floating on the surface of the liquid body in said tank into said float collection box.

19. A system according to claim 14 further including drive unit means mounted above said tank and coupled to rotatably drive said raking mechanism and said skimmer mechanism.

20. A system according to claim 14 further including perforated conduit means mounted within said confined liquid zone in said tank on the lower edge of said upstanding partition wall to collect liquid from the confined liquid zone.

21. In a wastewater treatment system of the activated sludge type including a primary clarifier, a biological treatment unit and a secondary clarifier, the improvement comprising:
   a. a treatment unit for concomitantly treating sewage and aerated secondary sludge, said treatment unit including an open tank, an upper feedwell for introducing aerated secondary sludge into said tank, a lower feedwell for introducing sewage below said upper feedwell in said tank, and a continuous partition wall mounted to define a confined liquid zone in the upper part of said tank;
   b. means connected to said lower feedwell for introducing sewage into said lower feedwell;
   c. float collection means mounted within said confined liquid zone in said tank for collecting solids floating on the surface of the liquid within said confined zone;
   d. sediment collection means connected in communication with the bottom of said treatment unit for collecting and discharging sediment therefrom;
   e. discharge means mounted in said tank outside said confined liquid zone for drawing liquid from the surface of the body of liquid held in said tank outside said confined liquid zone;
   f. pressurized aeration means coupled in flow communication with said upper feedwell to aerate liquid at super-atmospheric pressure to form a stream of aerated liquid;
   g. means to convey a stream of secondary sludge from said secondary clarifier to mix with the stream of aerated liquid to form a stream of aerated secondary sludge; and
   h. means to introduce the aerated secondary sludge into said upper feedwell.

* * * * *